United States Patent
Liu

(10) Patent No.: US 10,606,915 B2
(45) Date of Patent: Mar. 31, 2020

(54) ANSWER SEARCHING METHOD AND DEVICE BASED ON DEEP QUESTION AND ANSWER

(71) Applicant: BEIJING BAIDU NETCOM SCIENCE AND TECHNOLOGY CO., LTD., Beijing (CN)

(72) Inventor: Xiong Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 155 days.

(21) Appl. No.: 15/642,391

(22) Filed: Jul. 6, 2017

(65) Prior Publication Data

US 2018/0181673 A1 Jun. 28, 2018

(30) Foreign Application Priority Data

Dec. 28, 2016 (CN) .......................... 2016 1 1235007

(51) Int. Cl.
| | |
|---|---|
| *G06F 16/958* | (2019.01) |
| *G06F 17/27* | (2006.01) |
| *G06F 16/242* | (2019.01) |
| *G06F 16/9537* | (2019.01) |
| *G06F 16/332* | (2019.01) |

(52) U.S. Cl.
CPC .......... *G06F 16/972* (2019.01); *G06F 16/243* (2019.01); *G06F 16/3329* (2019.01); *G06F 16/9537* (2019.01); *G06F 17/279* (2013.01)

(58) Field of Classification Search
None
See application file for complete search history.

(56) References Cited

U.S. PATENT DOCUMENTS

| | | | | |
|---|---|---|---|---|
| 2008/0027888 | A1* | 1/2008 | Azzam | G06F 16/345 |
| | | | | 706/45 |
| 2014/0236578 | A1* | 8/2014 | Malon | G06F 17/28 |
| | | | | 704/9 |
| 2015/0186534 | A1* | 7/2015 | Chechik | G06F 16/9535 |
| | | | | 707/728 |

FOREIGN PATENT DOCUMENTS

| | | |
|---|---|---|
| CN | 105760417 | 7/2016 |
| CN | 106202301 | 12/2016 |

OTHER PUBLICATIONS

SIPO, First Office Action for CN Application No. 201611235007.7, dated Aug. 9, 2019.

\* cited by examiner

*Primary Examiner* — Charles D Adams
(74) *Attorney, Agent, or Firm* — Hodgson Russ LLP

(57) ABSTRACT

The present disclosure provides an answer searching method and device based on deep question and answer. The method includes: receiving a query statement; obtaining webpages containing candidate answers by searching according to the query statement; obtaining a first candidate answer, a second candidate answer and a third candidate answer based on a webpage analysis method, a deep learning method and a template matching method respectively; determining a final answer according to the first candidate answer, the second candidate answer and the third candidate answer; and displaying the final answer.

7 Claims, 9 Drawing Sheets

News  Video  Webpage  Map  Tieba  Application  More ▼ which company does StarCraft belong to  🎤 ▼    Search          — 41

Which company is StarCraft developed by?_Zhidao

Blizzard Entertainment

Which company is StarCraft2 developed by?          2 answers

Which company is StarCraft issued by?              3 answers

Which company is actually StarCraft2 developed by? 10 answers

Zhidao                                                    >

Which company is StarCraft invented by?_Zhidao 3 answers-query time: June 11, 2014
[Best answer] Blizzard Entertainment is a world famous computer game and video game software company, currently belongs to Vivend's subsidiary, its ...

Fig. 4(a)

ANSWER SEARCHING METHOD AND DEVICE BASED ON DEEP QUESTION AND ANSWER

This application is based on and claims priority to Chinese Patent Application No. 201611235007.7, filed on Dec. 28, 2016, the entire contents of which are incorporated herein by reference.

FIELD

The present disclosure relates to an internet technology field, and more particularly to an answer searching method and device based on deep question and answer.

BACKGROUND

Deep question and answer means a technology which can understand languages of human, intelligently identify meaning of a question, and extract an answer to the question from a huge number of internet data.

With the rapid development of the internet, functions of the search engine are becoming more and more powerful, and an expectation of users to the search engine is also getting higher and higher, starting to change from recalling basically related webpages to the intelligent question and answer. When a user inputs a question to be queried to the search engine, the user expects to directly obtain an answer of the question rather than to obtain related webpages.

However, search engine technology in the related art can only provide webpages with higher relevancy as a search result to the user by information retrieval technology and document summarization technology, and the user needs to determine webpages to be viewed according to a combination of webpage titles, text summary, or further webpage links and needs to extract a required answer by himself. Therefore, the search engine technology in the related art does not have a deep question and answer function, and cannot directly provide an answer of the question for the user, and thus the effect for displaying search results is poor.

SUMMARY

Embodiments of the present disclosure seek to solve at least one of the problems existing in the related art to at least some extent.

Embodiments of a first aspect of the present disclosure provide an answer searching method based on deep question and answer, including: receiving a query statement; obtaining webpages containing candidate answers by searching according to the query statement; obtaining a first candidate answer, a second candidate answer, and a third candidate answer based on a webpage analysis method, a deep learning method, and a template matching method respectively; determining a final answer according to the first candidate answer, the second candidate answer, and the third candidate answer; and displaying the final answer.

Embodiments of a second aspect of the present disclosure provide an answer searching device based on deep question and answer, including: a receiving module, configured to receive a query statement; a search module, configured to obtain webpages containing candidate answers by searching according to the query statement; an obtaining module, configured to obtain a first candidate answer, a second candidate answer and a third candidate answer based on a webpage analysis method, a deep learning method and a template matching method respectively; a determining module, configured to determine a final answer according to the first candidate answer, the second candidate answer and the third candidate answer; and a displaying module, configured to display the final answer.

Embodiments of a third aspect of the present disclosure provide a terminal, including: one or more processors; and a memory configured to store instructions executable by the one or more processors, wherein the one or more processors is configured to execute following steps:
receiving a query statement;
searching according to the query statement to obtain webpages containing candidate answers; obtaining a first candidate answer, a second candidate answer, and a third candidate answer based on a webpage analysis method, a deep learning method, and a template matching method respectively;
determining a final answer according to the first candidate answer, the second candidate answer, and the third candidate answer; and
displaying the final answer.

Embodiments of a fourth aspect of the present disclosure provide a non-transitory computer-readable storage medium configured to store one or more programs that, when executed by a processor of a mobile terminal, cause the mobile terminal to execute an answer searching method based on deep question and answer, the method including:
receiving a query statement;
obtaining webpages containing candidate answers by searching according to the query statement;
obtaining a first candidate answer, a second candidate answer and a third candidate answer based on a webpage analysis method, a deep learning method and a template matching method respectively;
determining a final answer according to the first candidate answer, the second candidate answer and the third candidate answer; and
displaying the final answer.

Embodiments of a fifth aspect of the present disclosure provide a program product. When instructions in the program product are executed by a processor, the processor is caused to execute an answer searching method based on deep question and answer, the method including:
receiving a query statement;
obtaining webpages containing candidate answers by searching according to the query statement;
obtaining a first candidate answer, a second candidate answer and a third candidate answer based on a webpage analysis method, a deep learning method and a template matching method respectively;
determining a final answer according to the first candidate answer, the second candidate answer and the third candidate answer; and
displaying the final answer.

With the the present disclosure, an answer corresponding to the question queried by the user can be directly displayed in the search result page, thus improving relevancy and accuracy of answer searching and improving presentation effect of search results.

BRIEF DESCRIPTION OF THE DRAWINGS

These and other aspects and advantages of embodiments of the present disclosure will become apparent and more readily appreciated from the following descriptions made with reference to the drawings, in which:

FIG. 4(a) is a schematic diagram of a search result displaying interface in the related art;

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. Instead, the embodiments of the present disclosure comprise all the variants, modifications and their equivalents within the spirit and scope of the present disclosure as defined by the claims.

With the development of the network information technology, the user's demand for a search engine is not limited to recalling the basically related webpages, and changes to intelligent question and answer.

However, the search engine in the related art can only provide search results related to a query to the user by traditional information retrieval technology and document summarization technology. Moreover, words that can summarize page content are extracted from the page by summary calculation and are provided to the user for assisting the user in determining content to be clicked. The user can determine a webpage to be viewed according to a combination of webpage titles, text summary, or further webpage links and needs to extract a required answer by himself. Therefore, there are following disadvantages in the search engine technology.

(1). An answer obtained is not quite relevant to a question. The search engine generally searches based on keyword matching in the related art, and correlation between the search results and the question depends on a number and a location of a central word and a keyword of a question queried by the user, thus ignoring substance of the question and a type of an answer that the user needs. In addition, the summary calculation is usually centered on webpage content rather than considering the question of the user, resulting in a low correlation between a webpage summary and the question.

(2). Presentation effect of search results is poor. For the search results obtained by existing searching technology, answers to the question queried by the user may appear at any position of the search results. For example, an answer may be in a webpage title, in a webpage summary or further in webpage content. It is difficult for the user to directly obtain the answer to the question, and presentation effect of search results is poor, thus reducing user experience.

Therefore, in order to overcome the disadvantages in the related art, the present disclosure provides an answer searching method based on deep question and answer, to simply and clearly display answers to the question queried by the user in a search result page.

Figure 1:
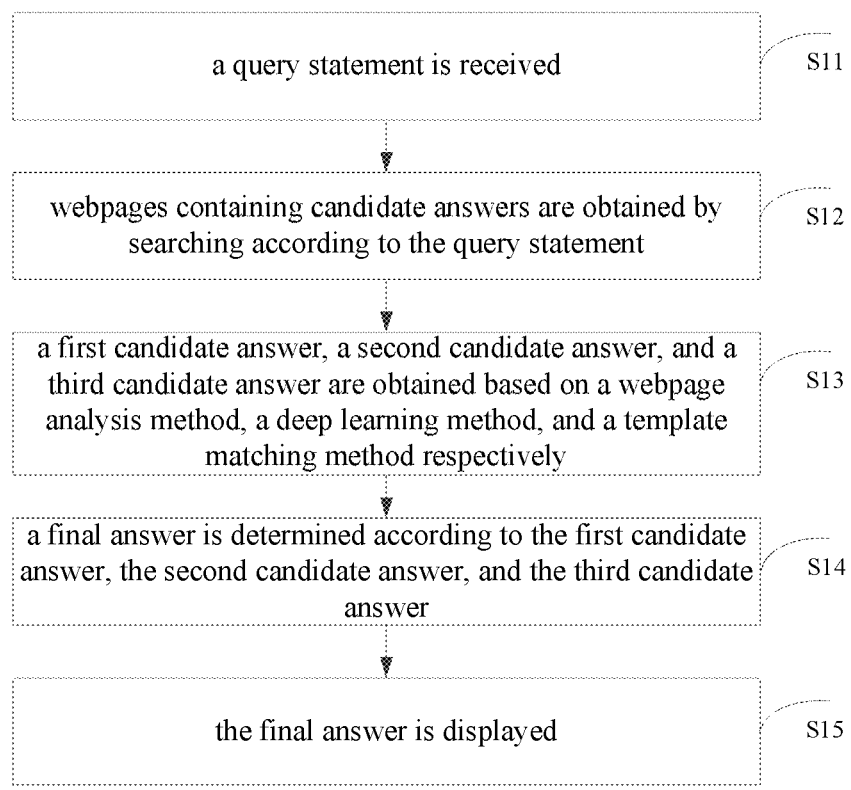
FIG. 1 is a flow chart of an answer searching method based on deep question and answer according to an embodiment of the present disclosure.

FIG. 1 is a flow chart of an answer searching method based on deep question and answer according to an embodiment of the present disclosure.

As shown in FIG. 1, the answer searching method based on deep question and answer according to an embodiment of this present disclosure includes followings.

In block S11, a query statement is received.

In this embodiment, when the user wants to query an answer to a question, for example, when the user wants to know a company that develops a game of "Overwatch", the user can input a question to be queried to a search engine, i.e., input "which company develops Overwatch?" or input "which company is Overwatch developed by?". The search engine receives the query statement input by the user and performs answer searching.

In block S12, webpages containing candidate answers are obtained by searching according to the query statement.

In this embodiment, after the search engine receives the query statement input by the user, the search engine can search according to the search statement to obtain the webpages containing candidate answers.

Figure 2:
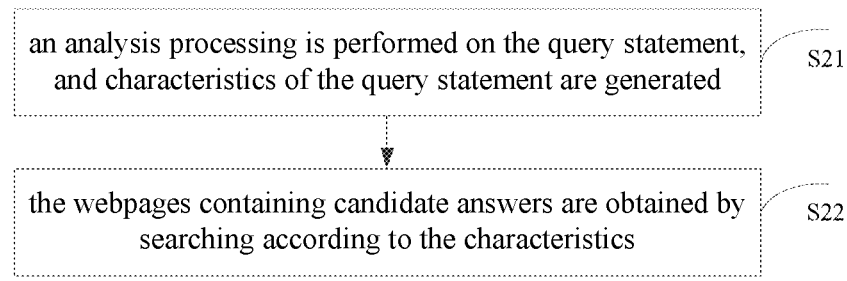
FIG. 2 is a flow chart of obtaining webpages containing candidate answers by searching according to the query statement according to an embodiment of the present disclosure.

Specifically, as shown in FIG. 2, block 12 may include following blocks.

In block S21, an analysis processing is performed on the query statement, and characteristics of the query statement are generated.

The analysis processing includes but is not limited to at least one of word segmentation, part-of-speech tagging, named entity recognition, semantic role labeling, syntax dependency parsing, and semantic dependency analysis.

In this embodiment, after the search engine receives the query statement input by the user, the search engine can perform processing such as the word segmentation, the part-of-speech tagging, the named entity recognition, the semantic role labeling, the syntax dependency parsing, and the semantic dependency analysis on the query statement, and generate the characteristics of the query statement.

It should be noted that, the word segmentation, the part-of-speech tagging, the named entity recognition, the semantic role labeling, the syntax dependency parsing, and the semantic dependency analysis are commonly used technologies for statement analysis and processing in natural language processing field, which are not described in detail to avoid redundancy.

In block S22, the webpages containing candidate answers are obtained by searching according to the characteristics.

In this embodiment, after the analysis processing is performed on the query statement, and after the characteristics of the query statement are generated, the webpages containing candidate answers can be obtained by searching according to the characteristics.

In this embodiment, after detailed analysis processing is performed on the query statement, and after the characteristics of the query statement are generated, by performing webpage searching according to the generated characteristics, correlation between the query statement and searched webpages is improved. Because there is a higher correlation between the query statement and the searched webpages, at least one candidate answer corresponding to the query statement can be found in the searched webpages.

In block S13, a first candidate answer, a second candidate answer, and a third candidate answer are obtained based on a webpage analysis method, a deep learning method, and a template matching method respectively.

In this embodiment, after webpages containing candidate answers are obtained by searching according to the query statement, the first candidate answer can be obtained based on the webpage analysis method, the second candidate answer can be obtained based on the deep learning method, and the third candidate answer can be obtained based on the template matching method.

The first candidate answer can be obtained based on the webpage analysis method as follows. A structure analysis and a content analysis are performed on the webpages containing candidate answers, to obtain structure information and content information of sentences in the webpages, and the first candidate answer is selected from the sentences in the webpages according to the structure information, the content information, and the characteristics of the query statement.

There is a possibility that sentences in the webpages can be directly regarded as an answer to the query statement. For example, sentences in a question and answer community website may be regarded as an answer to the query statement. In this embodiment, a purpose of obtaining the first candidate answer based on the webpage analysis method is to directly select a sentence from the sentences of the webpages as the answer to the query statement.

Specifically, obtaining the first candidate answer based on the webpage analysis method can be performed according to followings. The structure analysis is performed on the webpages containing candidate answers in combination with information of the webpages such as tags and visual effects of the webpages, to obtain the structure information (such as types, titles, text, time, paragraphs, and the like) of the webpages. The content analysis is performed on the webpages containing candidate answers according to the structure information, to obtain the content information of the sentences in the webpages. Then the first candidate answer is selected from the sentences in the webpages according to the structure information, the content information, and in combination with the characteristics of the query statement.

The second candidate answer is obtained based on the deep learning method as follows. A sentence vector of the query statement, sentence vectors of the candidate answers contained in the webpages, and structural knowledge vectors in a structural knowledge base are obtained and input to a convolutional neural network, to obtain a middle information vector, and the middle information vector is input to a recurrent neural network, to generate the second candidate answer.

The structural knowledge base is also called a triple knowledge base, including a plurality of ternary relations. Each of the plurality of ternary relations includes two entities and a relation between the two entities. For example, Zhang Jie and Xie Na are two entities, and couple is a relation between Zhang Jie and Xie Na, and thus Zhang, Jie, Xie Na, and the couple form a ternary relation.

In this embodiment, for obtaining the second candidate answer based on the deep learning method, it needs to first obtain the sentence vector of the query statement, the sentence vectors of the candidate answers contained in the webpages, and the structural knowledge vectors in the structural knowledge base.

It should be noted that, the sentence vector of the query statement, the sentence vectors of the candidate answers contained in the webpages, and the structural knowledge vectors in the structural knowledge base can be built based on word vectors obtained by training large-scale corpus, which is not described in detail in the present disclosure.

After the sentence vector of the query statement, the sentence vectors of the candidate answers contained in the webpages, and the structural knowledge vectors in the structural knowledge base are obtained, the sentence vector of the query statement, sentence vectors of the candidate answers contained in the webpages, and structural knowledge vectors in the structural knowledge base are input together to the convolutional neural network, and encoded by the convolutional neural network. A strongest characteristic in the input vectors is extracted, and the middle information vector is finally generated.

After the middle information vector is obtained, the middle information vector is input to the recurrent neural network for decoding, and the second candidate answer is generated finally.

Figure 3:
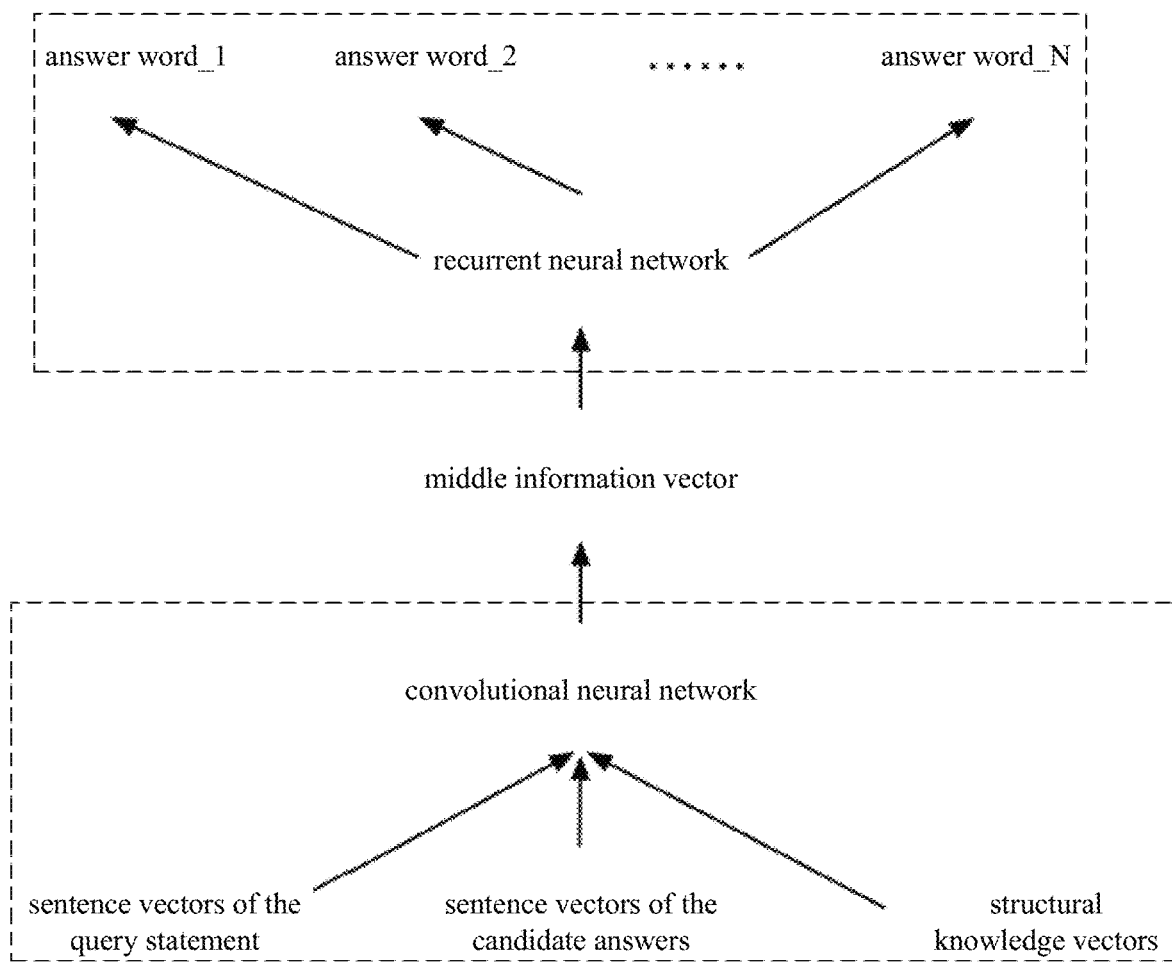
FIG. 3 is a schematic diagram of obtaining a second candidate answer based on a deep learning method according to an embodiment of the present disclosure.

As an example, FIG. 3 shows a schematic diagram of obtaining a second candidate answer based on a deep learning method according to an embodiment of the present disclosure.

As shown in FIG. 3, after the sentence vector of the query statement, sentence vectors of the candidate answers contained in the webpages, and structural knowledge vectors in the structural knowledge base are input to the convolutional neural network and encoded, the middle information vector is obtained. After the middle information vector is input to the recurrent neural network for decoding, answer word_1, answer word_2, . . . , and answer word_N can be obtained, in which, N is a positive integer.

It should be noted that, a number of answer words obtained after encoding by the convolutional neural network and decoding by the recurrent neural network is same as a number of ternary relations that can be obtained in the sentence vectors of the candidate answers, and that matches the structural knowledge vectors in the structural knowledge base.

The third candidate answer is obtained based on the template matching method as follows. The candidate answers in the webpages containing candidate answers are obtained, a semantic analysis is performed on the candidate answers to extract word characteristics of the candidate answers, candidate templates are obtained from an answer template according to the word characteristics, a correlation between each of the candidate templates and the query statement is obtained, an answer template is obtained from the candidate templates according to the correlation, and the third candidate answer is generated according to the answer template.

The answer template base can be generated by training a related training model. With increase of webpage resources and prosperity of the question and answer community websites, it is easy to obtain a large amount of question and answer pairs through internet. Model training is performed by taking the obtained question and answer pairs as training corpus, and thus a required answer template base can be generated by the training.

In this embodiment, when the third candidate answer is obtained based on the template matching method, the candidate answers are first obtained from the webpages containing candidate answers. Then, the semantic analysis is performed on the candidate answers to extract the word characteristics of the candidate answers, for example, entity words, important demonstratives, and the like are extracted from the candidate answers. And then, templates in the answer template base are matched with the word characteristics to obtain the candidate templates.

After the candidate templates are obtained, the correlation between each of the candidate templates and the query statement is obtained in combination with the query statement, and the answer template is obtained from the candidate templates according to the correlation, and then the third candidate answer is generated according to the answer template.

For example, if a query statement input by the user is "When is Yao Ming's birthday?", and a candidate answer obtained from the webpages containing candidate answers is "Yao Ming, born on Sep. 12, 1980 in Shanghai", word characteristics extracted from the candidate answers are "Yao Ming", "Sep. 12, 1980", "born" and "Shanghai". Candidate templates obtained from the answer template base according to the extracted word characteristics are "Yao Ming birthday Sep. 12, 1980" and "Yao Ming born Shanghai". Combining with the query statement, it can be determined that the candidate template "Yao Ming birthday Sep. 12, 1980" has a higher correlation with the query statement, and is determined to be the answer template. And then, the third candidate answer, for example, "Yao Ming's birthday is Sep. 12, 1980", is generated according to the answer template.

In block S14, a final answer is determined according to the first candidate answer, the second candidate answer, and the third candidate answer.

In this embodiment, after the first candidate answer, the second candidate answer, and the third candidate answer are obtained based on the webpage analysis method, the deep learning method, and the template matching method respectively, the final answer is determined according to the first candidate answer, the second candidate answer, and the third candidate answer.

It should be noted that, a process of determining the final answer according to the first candidate answer, the second candidate answer, and the third candidate answer will be given in the following, which is not described in detail here.

In block S15, the final answer is displayed.

In this embodiment, after the final answer is determined, the final answer can be displayed in a search result displaying page.

Alternatively, the final answer can be directly displayed at a preset position in the search result providing page.

For example, in order to make it easy for the user to obtain the final answer, the preset position can be disposed under a search box, and thus the final answer is directly displayed under the search box.

It should be noted that, the preset position is set in advance, and the position of the preset position in the search result providing page is not limited in the present disclosure.

Figure 4B:
FIG. 4(b) is a schematic diagram of a search result displaying interface of a search engine using the answer searching method according to an embodiment of the present disclosure.

FIG. 4(a) is a schematic diagram of a search result displaying interface in the related art. FIG. 4(b) is a schematic diagram of a search result displaying interface of a search engine using the answer searching method according to an embodiment of the present disclosure.

As shown in FIG. 4(a) and FIG. 4(b), when a same query statement "which company does StarCraft belong to" is input to the search box 41, different displaying effects appear in FIG. 4(a) and FIG. 4(b). Compared with FIG. 4(a), FIG. 4(b) further displays related content 42 in deep question and answer. From the related content 42 in FIG. 4(b), the user can easily obtain an answer "Blizzard Entertainment" to the query statement, and can obtain more detailed related content, such as official issue date of StarCraft. Therefore, compared with traditional search engine, the search engine adopting the answer searching method according to embodiments of the present disclosure can display clearer and more comprehensive search results.

With the answer searching method based on deep question and answer according to embodiments of the present disclosure, by receiving the query statement, obtaining webpages containing candidate answers by searching according to the query statement, obtaining the first candidate answer, the second candidate answer, and the third candidate answer based on the webpage analysis method, the deep learning method, and the template matching method respectively, and determining and displaying the final answer according to the first candidate answer, the second candidate answer, and the third candidate answer, an answer corresponding to the question queried by the user can be directly displayed in the search result page, thus improving relevancy and accuracy of answer searching and improving presentation effect of search results.

Figure 5:
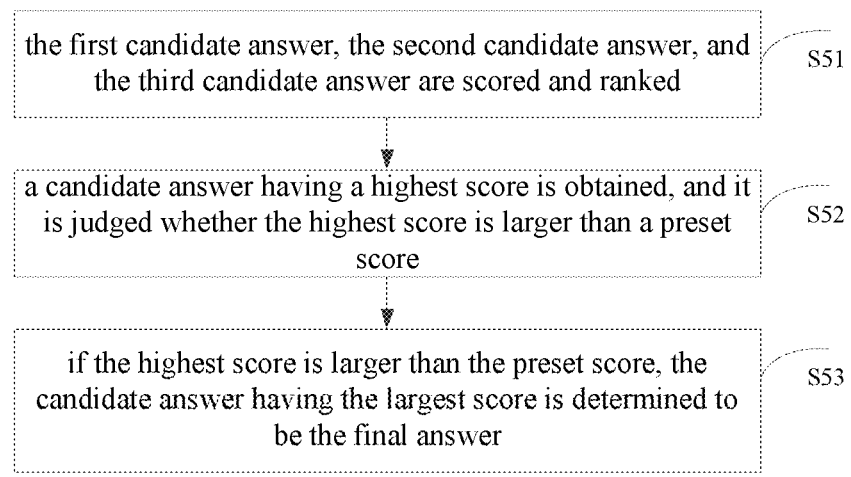
FIG. 5 is a flow chart of an answer searching method according to another embodiment of the present disclosure.

FIG. 5 is a flow chart of an answer searching method according to another embodiment of the present disclosure.

As shown in FIG. 5, based on the above embodiments, block S14 may include followings.

In block S51, the first candidate answer, the second candidate answer, and the third candidate answer are scored and ranked.

In this embodiment, after the first candidate answer, the second candidate answer, and the third candidate answer are obtained based on the webpage analysis method, the deep learning method, and the template matching method respectively, the first candidate answer, the second candidate, and the third candidate are scored and ranked according to scores.

It should be noted that, the higher a score of a candidate answer is, the higher a reliability of the candidate answer is, i.e., the higher a score of a candidate answer is, the closer to a correct answer the candidate answer is.

In block S52, a candidate answer having a highest score is obtained, and it is judged whether the highest score is larger than a preset score.

In this embodiment, after the first candidate answer, the second candidate answer, and the third candidate answer are scored and ranked, the candidate answer having the highest score is obtained. The highest score is compared with the preset score, and it is judged whether the highest score is larger than the preset score.

It should be noted that, the preset score is set in advance. The higher the preset score is, the stricter a requirement for the candidate answer having the highest score is, i.e., the more accurate the final answer is.

In block S53, if the highest score is larger than the preset score, the candidate answer having the largest score is determined to be the final answer.

In this embodiment, the score of the candidate answer having the highest score is compared with the preset score. When the highest score is larger than the preset score, the candidate answer having the largest score is determined to be the final answer. When the highest score is not larger than the preset score, webpages having high relevance to the query are provided in the search result displaying page according to the existing search engine technology.

With the answer searching method based on deep question and answer according to embodiments of the present disclosure, by scoring and ranking the first candidate answer, the second candidate answer and the third candidate answer, obtaining a candidate answer having a highest score, comparing the highest score with a preset score, and determining the candidate answer having the largest score to be the final answer when the highest scores is greater than the preset score, accuracy of the final answer can be ensured.

Figure 6:
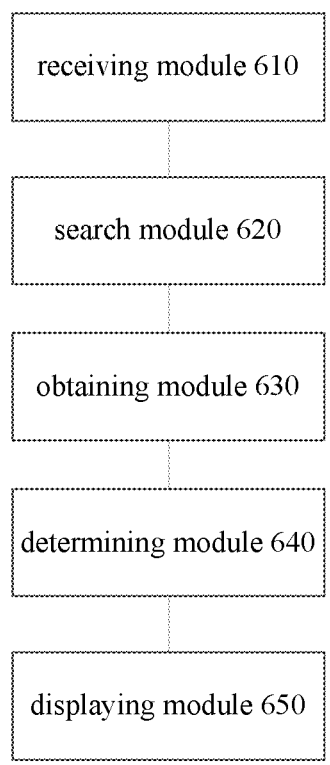
FIG. 6 is a block diagram of an answer searching device based on deep question and answer according to an embodiment of the present disclosure.

In order to realize the above embodiments, the present disclosure also provides an answer searching device based on deep question and answer. FIG. 6 is a block diagram of an answer searching device based on deep question and answer according to an embodiment of the present disclosure.

As shown in FIG. 6, the answer searching device based on deep question and answer includes a receiving module 610, a search module 620, an obtaining module 630, a determining module 640, and a displaying module 650.

The receiving module 610 is configured to receive a query statement.

The search module 620 is configured to obtain webpages containing candidate answers by searching according to the query statement.

Figure 7:
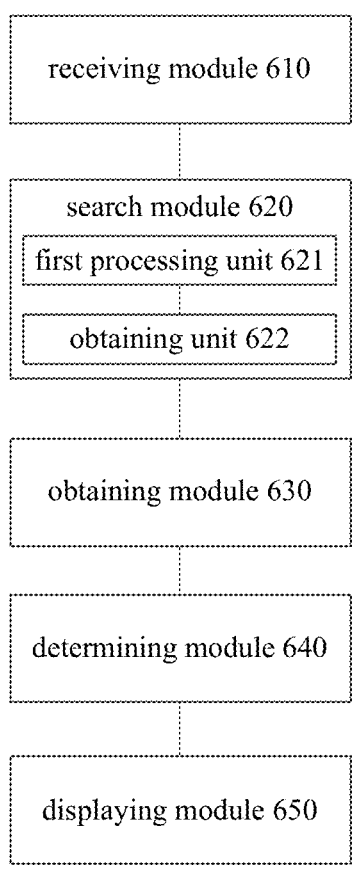
FIG. 7 is a block diagram of an answer searching device based on deep question and answer according to another embodiment of the present disclosure.

Specifically, as shown in FIG. 7, the searching module 620 includes a first processing unit 621 and an obtaining unit 622.

The first processing unit 621 is configured to perform an analysis processing on the query statement, and to generate characteristics of the query statement.

The analysis processing includes at least one of word segmentation, part-of-speech tagging, named entity recognition, semantic role labeling, syntax dependency parsing, and semantic dependency analysis;

The obtaining unit 622 is configured to obtain the webpages containing candidate answers by searching according to the characteristics.

The obtaining module 630 is configured to obtain a first candidate answer, a second candidate answer and a third candidate answer based on a webpage analysis method, a deep learning method and a template matching method respectively.

Specifically, the obtaining module 630 is configured to perform a structure analysis and a content analysis on the webpages containing candidate answers to obtain structure information and content information of sentences in the webpages, and to select the first candidate answer from the sentences in the webpages according to the structure information, the content information and the characteristics of the query statement.

The obtaining module 630 is configured to obtain a sentence vector of the query statement, sentence vectors of the candidate answers contained in the webpages and structural knowledge vectors in a structural knowledge base, to input the sentence vector of the query statement, sentence vectors of the candidate answers contained in the webpages and structural knowledge vectors in the structural knowledge base to a convolutional neural network to generate a middle information vector, and to input the middle information vector to a recurrent neural network to generate the second candidate answer.

The obtaining module 630 is configured to obtain the candidate answers in the webpages containing candidate answers, to perform a semantic analysis on the candidate answers to extract word characteristics of the candidate answers, to obtain candidate templates from an answer template base according to the word characteristics, obtain a correlation between each of the candidate templates and the query statement and determine an answer template from the candidate templates according to the correlation, and to generate the third candidate answer according to the answer template.

The determining module 640 is configured to determine a final answer according to the first candidate answer, the second candidate answer and the third candidate answer; and The displaying module 650 is configured to display the final answer.

Alternatively, the displaying module 650 can directly display the final answer at a preset position in a search result providing page.

It should be noted that, the explanation in above embodiments of an answer searching method based on deep question and answer is also applicable to the embodiments of an answer searching device based on deep question and answer, with similar implementation principle, which is not described here.

With the answer searching device based on deep question and answer according to embodiments of the present disclosure, by receiving the query statement, obtaining webpages containing candidate answers by searching according to the query statement, obtaining the first candidate answer, the second candidate answer, and the third candidate answer based on the webpage analysis method, the deep learning method, and the template matching method respectively, and determining and displaying the final answer according to the first candidate answer, the second candidate answer, and the third candidate answer, an answer corresponding to the question queried by the user can be directly displayed in the search result page, thus improving relevancy and accuracy of answer searching and improving presentation effect of search results.

Figure 8:
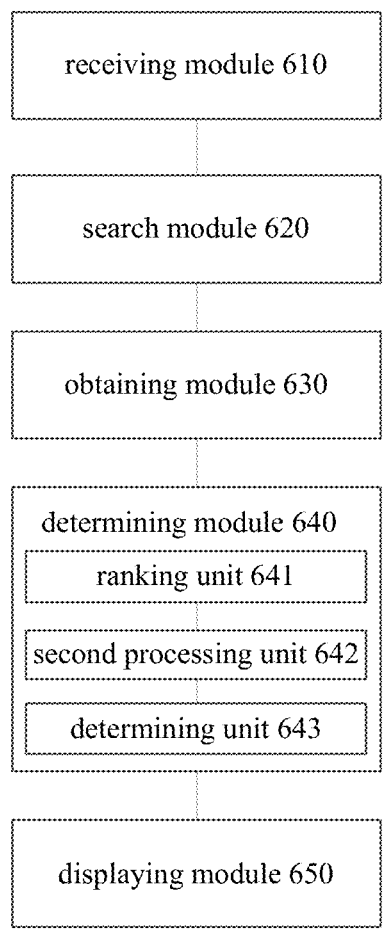
FIG. 8 is a block diagram of an answer searching device based on deep question and answer according to yet another embodiment of the present disclosure.

FIG. 8 is a block diagram of an answer searching device based on deep question and answer according to an additional embodiment of the present disclosure.

As shown in FIG. 8, based on the embodiment shown in FIG. 6, the determining module 640 includes a ranking unit 641, a second processing unit 642, and a determining unit 643.

The ranking unit 641 is configured to score and rank the first candidate answer, the second candidate answer and the third candidate answer.

The second processing unit 642 is configured to obtain a candidate answer having a highest score, and judging whether the highest score is larger than a preset score.

The determining unit 643 is configured to determine the candidate answer having the highest score to be the final answer when the highest score is larger than the preset score.

It should be noted that, the explanation in above embodiments of an answer searching method based on deep question and answer is also applicable to the embodiments of an answer searching device based on deep question and answer, with similar implementation principle, which is not described here.

With the answer searching device based on deep question and answer according to embodiments of the present disclosure, by scoring and ranking the first candidate answer, the second candidate answer and the third candidate answer, obtaining a candidate answer having a highest score, comparing the highest score with the preset score, and determining the candidate answer having the largest score to be the final answer when the highest score is larger than the preset score, accuracy of the final answer can be ensured.

In order to realize the above embodiments, the present disclosure also provides a terminal, including a processor, and a memory configured to store instructions executable by the processor. The processor is configured to perform the answer searching method based on deep question and answer according to embodiments of the present disclosure.

It should be noted that, the explanation in above embodiments of an answer searching method based on deep question and answer is also applicable to the embodiments of an answer searching device based on deep question and answer, with similar implementation principle, which is not described here.

With the terminal according to the embodiments of the present disclosure, by receiving the query statement, obtaining webpages containing candidate answers by searching according to the query statement, obtaining the first candidate answer, the second candidate answer, and the third candidate answer based on the webpage analysis method, the deep learning method, and the template matching method respectively, and determining and displaying the final answer according to the first candidate answer, the second candidate answer, and the third candidate answer, an answer corresponding to the question queried by the user can be directly displayed in the search result page, thus improving relevancy and accuracy of answer searching and improving presentation effect of search results.

In order to realize the above embodiments, the present disclosure also provides a non-transitory computer-readable storage medium, configured to store one or more programs. When the one or more programs are executed by a processor of a mobile terminal, the mobile terminal is caused to execute the answer searching method based on deep question and answer according to the embodiments of the present disclosure.

With the non-transitory computer-readable storage medium according to embodiments of the present disclosure, by receiving the query statement, obtaining webpages containing candidate answers by searching according to the query statement, obtaining the first candidate answer, the second candidate answer, and the third candidate answer based on the webpage analysis method, the deep learning method, and the template matching method respectively, and determining and displaying the final answer according to the first candidate answer, the second candidate answer, and the third candidate answer, an answer corresponding to the question queried by the user can be directly displayed in the search result page, thus improving relevancy and accuracy of answer searching and improving presentation effect of search results.

In order to realize the above embodiments, the present disclosure also provides a program product, when instructions in the program product are executed by a processor, the processor is configured to perform the answer searching method based on deep question and answer according to the embodiments of the present disclosure.

With the program product according to embodiments of the present disclosure, by receiving the query statement, obtaining webpages containing candidate answers by searching according to the query statement, obtaining the first candidate answer, the second candidate answer, and the third candidate answer based on the webpage analysis method, the deep learning method, and the template matching method respectively, and determining and displaying the final answer according to the first candidate answer, the second candidate answer, and the third candidate answer, an answer corresponding to the question queried by the user can be directly displayed in the search result page, thus improving relevancy and accuracy of answer searching and improving presentation effect of search results.

It should be noted that, in the description of the present disclosure, terms such as "first" and "second" in descriptions of the present disclosure are used herein for purposes of description and are not intended to indicate or imply relative importance or significance. In addition, in the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. An answer searching method based on deep question and answer, comprising:
receiving a query statement;
obtaining webpages containing candidate answers by searching according to the query statement;
obtaining a first candidate answer, a second candidate answer and a third candidate answer based on a webpage analysis method, a deep learning method and a template matching method respectively;
scoring and ranking the first candidate answer, the second candidate answer and the third candidate answer;
obtaining a candidate answer having a highest score from the first candidate answer, the second candidate answer and the third candidate answer, and judging whether the highest score is larger than a preset score;
when the highest score is larger than the preset score, determining the candidate answer having the largest score to be a final answer; and displaying the final answer;
wherein obtaining the first candidate answer based on the webpage analysis method comprises:
performing a structure analysis and a content analysis on the webpages containing candidate answers, to obtain structure information and content information of sentences in the webpages; and
selecting the first candidate answer from the sentences in the webpages according to the structure information, the content information and the characteristics of the query statement;
wherein obtaining the second candidate answer based on the deep learning method comprises:
obtaining a sentence vector of the query statement, sentence vectors of the candidate answers contained in the webpages and structural knowledge vectors in a structural knowledge base;
inputting the sentence vector of the query statement, sentence vectors of the candidate answers contained in the webpages and structural knowledge vectors in the structural knowledge base to a convolutional neural network, to generate a middle information vector; and
inputting the middle information vector to a recurrent neural network, to generate the second candidate answer;
wherein obtaining the third candidate answer based on the template matching method comprises:
obtaining the candidate answers in the webpages containing candidate answers;
performing a semantic analysis on the candidate answers to extract word characteristics of the candidate answers;
obtaining candidate templates from an answer template base according to the word characteristics;
obtaining a correlation between each of the candidate templates and the query statement, and determining an answer template from the candidate templates according to the correlation; and
generating the third candidate answer according to the answer template.

2. The method according to claim 1, wherein obtaining webpages containing candidate answers by searching according to the query statement comprises:

performing an analysis processing on the query statement, and generating characteristics of the query statement, where, the analysis processing comprises at least one of word segmentation, part-of-speech tagging, named entity recognition, semantic role labeling, syntax dependency parsing, and semantic dependency analysis;
obtaining the webpages containing candidate answers by searching according to the characteristics.

3. The method according to claim 1, wherein displaying the final answer comprises:
directly displaying the final answer at a preset position in a search result providing page.

4. An answer searching device based on deep question and answer, comprising:
a processor; and
a memory, configured to store one or more software modules executable by the processor,
wherein the one or more software modules comprises:
a receiving module, configured to receive a query statement;
a search module, configured to obtain webpages containing candidate answers by searching according to the query statement;
an obtaining module, configured to obtain a first candidate answer, a second candidate answer and a third candidate answer based on a webpage analysis method, a deep learning method and a template matching method respectively;
a determining module, configured to determine a final answer according to the first candidate answer, the second candidate answer and the third candidate answer; and
a displaying module, configured to display the final answer;
wherein the determining module comprise: a ranking unit, configured to score and rank the first candidate answer, the second candidate answer and the third candidate answer; a second processing unit, configured to obtain a candidate answer having a highest score, and judging whether the highest score is larger than a preset score; and a determining unit, configured to determine the candidate answer having the largest score to be the final answer when the highest score is larger than the preset score;
wherein the obtaining module is further configured to:
perform a structure analysis and a content analysis on the webpages containing candidate answers, to obtain structure information and content information of sentences in the webpages; and
select the first candidate answer from the sentences in the webpages according to the structure information, the content information and the characteristics of the query statement;
wherein the obtaining module is further configured to:
obtain a sentence vector of the query statement, sentence vectors of the candidate answers contained in the webpages and structural knowledge vectors in a structural knowledge base;
input the sentence vector of the query statement, sentence vectors of the candidate answers contained in the webpages and structural knowledge vectors in the structural knowledge base to a convolutional neural network, to generate a middle information vector; and input the middle information vector to a recurrent neural network, to generate the second candidate answer;

wherein the obtaining module is further configured to:
obtain the candidate answers in the webpages containing candidate answers;
perform a semantic analysis on the candidate answers to extract word characteristics of the candidate answers;
obtain candidate templates from an answer template base according to the word characteristics;
obtain a correlation between each of the candidate templates and the query statement, and determine an answer template from the candidate templates according to the correlation; and
generate the third candidate answer according to the answer template.

5. The device according to claim 4, wherein the search module comprises:
a first processing unit, configured to perform an analysis processing on the query statement, and to generate characteristics of the query statement, where, the analysis processing comprises at least one of word segmentation, part-of-speech tagging, named entity recognition, semantic role labeling, syntax dependency parsing, and semantic dependency analysis;
an obtaining unit, configured to obtain the webpages containing candidate answers by searching according to the characteristics.

6. The device according to claim 4, wherein the displaying module is configured to:
directly display the final answer at a preset position in a search result providing page.

7. A non-transitory computer-readable storage medium, configured to store instructions that, when executed by a processor of a terminal, cause the terminal to perform an answer searching method based on deep question and answer, the method comprising:
receiving a query statement;
obtaining webpages containing candidate answers by searching according to the query statement;
obtaining a first candidate answer, a second candidate answer and a third candidate answer based on a webpage analysis method, a deep learning method and a template matching method respectively;
scoring and ranking the first candidate answer, the second candidate answer and the third candidate answer;
obtaining a candidate answer having a highest score from the first candidate answer, the second candidate answer and the third candidate answer, and judging whether the highest score is larger than a preset score;
when the highest score is larger than the preset score, determining the candidate answer having the largest score to be a final answer; and
displaying the final answer;
wherein obtaining the first candidate answer based on the webpage analysis method comprises:
performing a structure analysis and a content analysis on the webpages containing candidate answers, to obtain structure information and content information of sentences in the webpages; and
selecting the first candidate answer from the sentences in the webpages according to the structure information, the content information and the characteristics of the query statement;
wherein obtaining the second candidate answer based on the deep learning method comprises:
obtaining a sentence vector of the query statement, sentence vectors of the candidate answers contained in the webpages and structural knowledge vectors in a structural knowledge base;
inputting the sentence vector of the query statement, sentence vectors of the candidate answers contained in the webpages and structural knowledge vectors in the structural knowledge base to a convolutional neural network, to generate a middle information vector; and
inputting the middle information vector to a recurrent neural network, to generate the second candidate answer;
wherein obtaining the third candidate answer based on the template matching method comprises:
obtaining the candidate answers in the webpages containing candidate answers;
performing a semantic analysis on the candidate answers to extract word characteristics of the candidate answers;
obtaining candidate templates from an answer template base according to the word characteristics;
obtaining a correlation between each of the candidate templates and the query statement, and determining an answer template from the candidate templates according to the correlation; and
generating the third candidate answer according to the answer template.

* * * * *